Oct. 16, 1934.  C. O. GUERNSEY  1,977,127
INTERNAL COMBUSTION ENGINE
Filed Dec. 2, 1931
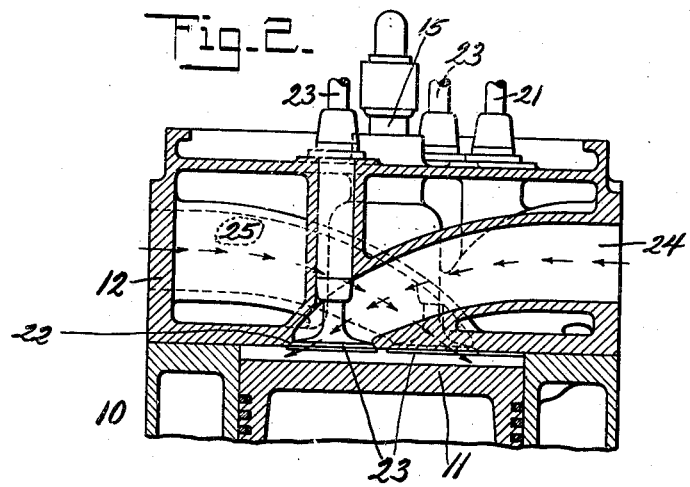
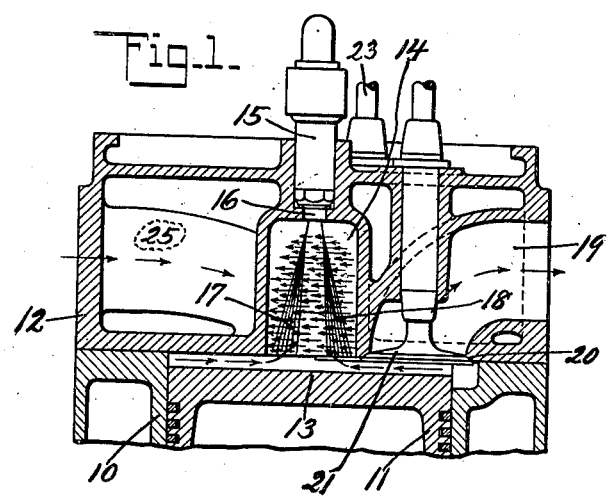
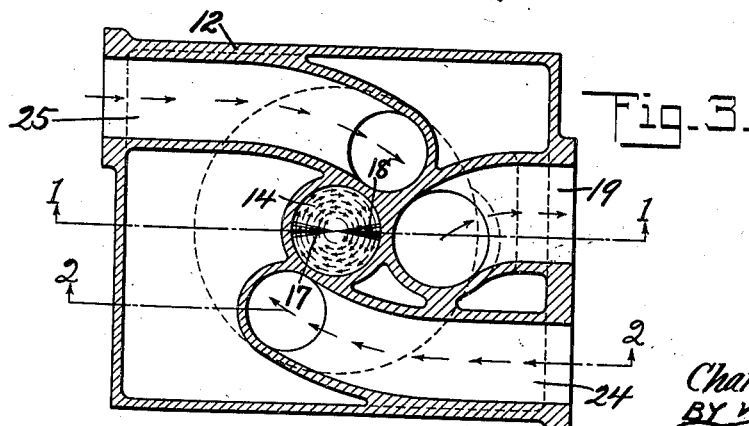
INVENTOR
Charles O. Guernsey
BY
ATTORNEY Patented Oct. 16, 1934

1,977,127

UNITED STATES PATENT OFFICE 1,977,127

INTERNAL COMBUSTION ENGINE

Charles O. Guernsey, Yeadon, Pa., assignor to American Car and Foundry Motors Company, New York, N. Y., a corporation of Delaware Application December 2, 1931, Serial No. 578,502

6 Claims. (Cl. 123—32)

This invention relates to internal combustion engines and with regard to certain more specific features thereof to internal combustion engines of the high compression type. Still more particularly it relates to the air intake arrangements and combustion chambers of such engines.

The invention has for one of its objects to attain an even and extremely thorough distribution of the liquid fuel in air which has been brought to a state of high compression at or prior to time of the introduction of the liquid fuel.

In engines of the high compression type the period within which the fuel must be introduced and mingled with the compressed air is so short and the working space for valves or other mechanical contrivances is so limited that difficult problems have arisen which the present invention has solved in a simple, inexpensive and highly efficient manner. Devices have been developed for increasing the air velocity at a single intake point and so-called shrouded valves have been proposed to give the air predetermined direction on its entry into the cylinder. These are unsatisfactory in that either they fail to provide the necessary force or turbulence to the air current to cause it to persist over the neutralizing action of the compression stroke and contact all the air with liquid fuel, or because they require additional sleeves and parts adding materially to the expense and detracting from the efficiency and durability of the engine. The use of shrouded valves or venturi creates a resistance which prevents a satisfactory filling of the chamber with air. This has been difficult to overcome as increase of the valve size is limited by the bore size of the engine. It is an object of the present invention to provide simple and reliably operative means which shall afford satisfactory filling and cause the air turbulence and high velocity in a predetermined direction to persist at the end of the compression stroke of the piston.

It is a further object of the present invention to insure ample air turbulence throughout the fuel injection operation and to insure not only that all the fuel injected shall be finely divided and mixed with compressed air but that all the air under compression shall have dispersed therein a suitable and substantially proportionate amount of fuel. To this end the present invention involves a combination of a combustion chamber formed in the cylinder head with an arrangement of spray-jets and air intake passages by which a high rotational velocity of air is induced in the combustion chamber and caused to persist therein during the fuel injection cycle of the engine. Completeness of fuel dispersion throughout the air column may be obtained according to the present invention by using comparatively few spray-jets and without exceptionally high fuel pressure. Many of the prior proposals require a large number of spray holes of very small size, making the spray nozzle a difficult piece to manufacture and very susceptible to clogging in operation.

Other objects will be in part obvious and in part pointed out particularly hereinafter.

In accordance with the rules reference is made to a copending application of the same inventor, Serial No. 578,501 filed Dec. 2, 1931.

In the accompanying drawing wherein is shown one of various possible embodiments of the invention:—

Fig. 1 is a view in vertical section along the axis of one cylinder on the improved engine, the section being taken substantially on the line 1—1 of Fig. 3;

Fig. 2 is a view in vertical cross section taken substantially along the line 2—2 of Fig. 3;

Fig. 3 is a horizontal section through the cylinder head and intake and outlet passages for the air.

Referring more particularly to the drawing a cylinder 10 is fitted with a piston 11 and a cylinder head 12. According to a preferred form of the invention the piston 11 is of usual construction with a flat head 13, and the cylinder head is formed with a central cylindrical recess 14 providing a combustion chamber. In the top of the combustion chamber, centrally arranged, is a fuel injector 15 having a spray nozzle 16 provided with diametrically opposed spray holes through which coarse sprays of liquid fuel 17 and 18 are directed downwardly and outwardly in the combustion chamber. The cylinder head contains an outlet or exhaust passage 19 and a seat 20 for an exhaust valve 21. The cylinder head also provides seats 22 for intake valves 23 of poppet type arranged diametrically on opposite sides of the combustion chamber. Communicating with the valves 23 and seats 22 are intake pasages or conduits 24 and 25 which are of some length and are directed substantially tangential of the cylinder cross section so that when the piston operates on its suction stroke and the poppets 23 are open, outside air will be induced in the passages 24 and 25 and given a predetermined direction of entrance to the cylinder 10. By reason of this intake construction air enters the cylinder through the open valves at high velocity and substantially parallel with the cylinder wall, whereby a swirling column of air is established in the cylinder. When the poppet valves 23 close and the piston operates on its compression stroke the swirling column of air is displaced to the combustion chamber 14. It will be seen from the drawing that the column of compressed air in the combustion chamber is centrally arranged with respect to the piston and cylinder, has a considerable depth and is relatively small in diameter. Near the end of the compression stroke the fuel injection pump operates to deliver liquid fuel in spray through the opposed nozzles as shown at 17 and 18 in Figs. 1 and 3.

The rate of swirl is calculated so that all the air in the column is caused to pass the spray from one or the other of the nozzles whereby the air is completely saturated with fuel and the latter is finely divided and vaporized by the compressed and consequently heated air. Combustion then takes place in the chamber and the piston is moved on its power stroke.

By the above described construction there is such intimate mixing of the fuel particles with the entire body of compressed air that combustion is substantially complete. The engine has high thermal efficiency, is quiet in operation and has an exhaust which is hardly visible under normal conditions. By reason of the form of air intake provided, a persisting high velocity swirl of air is present in the combustion chamber when the liquid fuel is supplied. This, in combination with the proper number of correctly arranged and directed fuel sprays, produces such a complete and well-organized fuel charge that the engine may be very closely regulated in fuel supply for varying loads. As a consequence a great saving in fuel is effected.

What is claimed is:

1. In an internal combustion engine, a cylinder, a piston therein and a cylinder head having a central combustion chamber and a pair of oppositely disposed tangentially arranged intake conduits for air.

2. In an internal combustion engine, a cylinder, a piston therein and a cylinder head provided with a central combustion chamber, a pair of oppositely disposed extended air intake passages tangential to the cylinder and a fuel injection nozzle at the top of the combustion chamber.

3. In an internal combustion engine, a cylinder, a piston therein, a cylinder head having a combustion chamber axial to the cylinder, intake valves in the cylinder head, oppositely disposed intake conduits leading to the valves adapted to induce an air flow along the cylinder wall, and a fuel injector in the combustion chamber.

4. In an internal combustion engine, a cylinder, a piston therein, said cylinder having a head defining a relatively deep and narrow cylindrical combustion chamber in line with the cylinder axis, means centrally arranged at the top of the combustion chamber for spraying liquid fuel downwardly and outwardly, air intakes in the cylinder head around the combustion chamber, so directed as to supply air tangentially of the cylinder on the suction stroke of the piston, whereby a rotating column of air is established within the cylinder and displaced to the combustion chamber on the compression stroke of the piston.

5. In an internal combustion engine, means forming a cylinder, a cylinder head, a recess in said cylinder head forming a combustion chamber, an air inlet conduit formed in said cylinder head at the side of said combustion chamber and substantially tangentially arranged with respect to said cylinder.

6. In an internal combustion engine, means forming a cylinder, a cylinder head having a face substantially normal to the axis of said cylinder, a pair of air inlet conduits formed in said cylinder head and discharging thru said face substantially tangentially with respect to said cylinder, said air inlet conduits being so arranged with respect to each other that the discharge from each will tend to produce a rotational movement of air in said cylinder in the same direction, and a combustion chamber formed in said cylinder head between said air inlet conduits.

CHARLES O. GUERNSEY.